United States Patent [19]

Little

[11] Patent Number: 5,829,798

[45] Date of Patent: Nov. 3, 1998

[54] KNOT-TYING DEVICE

[76] Inventor: Joe Little, 1941 Bishop Rd., Chehalis, Wash. 98532

[21] Appl. No.: 726,695

[22] Filed: Oct. 7, 1996

Related U.S. Application Data

[63] Continuation-in-part of Ser. No. 600,298, Feb. 12, 1996, Pat. No. 5,593,189.

[51] Int. Cl.⁶ ....................................................... D03J 3/00
[52] U.S. Cl. .............................................................. 289/17
[58] Field of Search ............................ 289/17, 18.1, 1.5, 289/2, 13, 15; 43/1, 4

[56] References Cited

U.S. PATENT DOCUMENTS 2,697,624  12/1954  Thomas et al. ........................... 289/17

*Primary Examiner*—Michael A. Neas
*Attorney, Agent, or Firm*—Jensen & Puntigam

[57] ABSTRACT

A device for assisting in the tying of fishing knots, including a handle end including means for forming loops and a working end including a bifurcated pointed end tapering outwardly toward the handle and including upstanding edges to guide the line and a thumb pad to be used when holding the line. A method of tying knots using the tool.

3 Claims, 4 Drawing Sheets

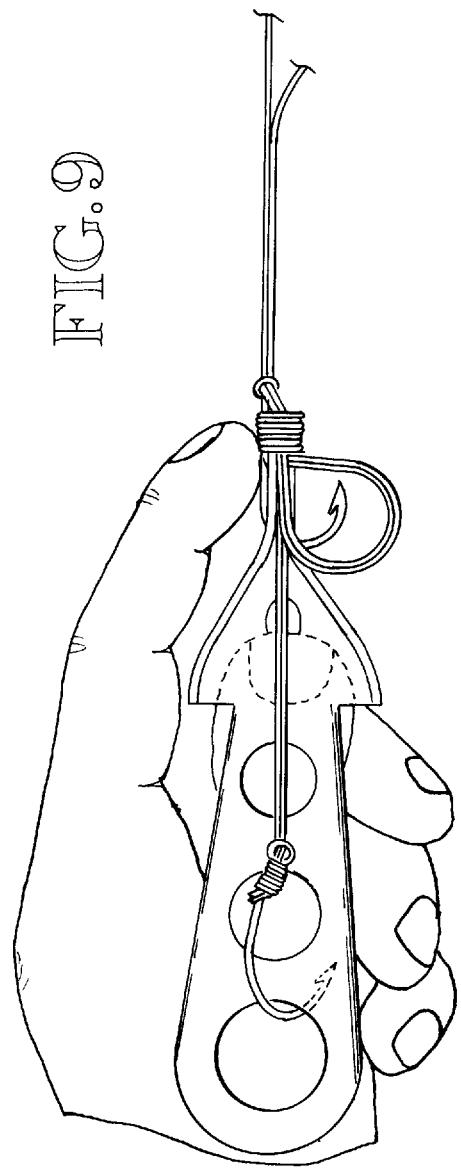

KNOT-TYING DEVICE

This application is a continuation-in-part of U.S. application Ser. No. 08/600,298, filed on Feb. 12, 1996, now U.S. Pat. No. 5,593,139.

TECHNICAL FIELD

This invention relates to the tying of knots, and in particular the tying of knots for fishermen, whether securing an object such as a hook or swivel to the line or in splicing lines wherein the lines could be of differing consistency or material. More particularly, this invention relates to a knot-tying device which is fabricated of a single piece of material, is inexpensive to manufacture and is simple to use for a variety of knots.

The inventive knot tying device permits the tying of superior knots and allows a novel method of tying said knots even with modern space-age fibers having slick surfaces.

BACKGROUND OF THE INVENTION

It has long been recognized that the tying of knots under adverse conditions including physical handicaps and failing eyesight often results in a poorly tied knot which results in an unsatisfactory securement. This knot tying problem is particularly true in activities such as fishing, wherein the knots are often secured while the person tying the knots is in a boat which is not stable, and the weather conditions may be adverse, including the fact that it could be cold, causing the user's fingers to be numb as well as the filament to be less flexible than might be expected.

Numerous prior art attempts have been made to resolve the dilemma of tying fishing knots in adverse conditions and yet resulting in a secure knot such that in a fishing activity, a prize catch or favorite lure will not be lost. No attempt has been made to solve the knot-tying problems of super lines and super braids. Super braids made of space age fibers have a slick surface, making the tying of conventional knots nearly impossible.

Prior art known to the inventor includes:

U.S. Pat. No. 2,758,858 granted to Smith, Jr. Aug. 14, 1956, discloses a knot tying tool which includes a first end for tying slipknots and incorporates a groove for holding a hook during the tying process and a groove through which the free end of the leader or the like may be fed to complete the knot and a second end including one or more portions having differing radii for tying fixed-loop or slip-type fastening elements.

U.S. Pat. No. 2,926,036 granted to Wimberley, Feb. 23, 1960, is a multi-part tying tool including such things as fish scalers, screw drivers and a sharp cutting edge.

U.S. Pat. No. 2,992,029 granted to Russell, Jul. 11, 1961, discloses a snelling tool for fish hooks wherein a standard key blank is somewhat modified and used for snelling a fish hook.

U.S. Pat. No. 3,131,957 granted to Musto, May 5, 1964, discloses a multi-part cylindrical element through which the leader is fed to assist in the tying of leaders and lines.

U.S. Pat. No. 3,177,021 granted to Benham, Apr. 6, 1965, discloses a two-part knot tying device wherein the first part is secured over the user's finger and the second part, which is a cylindrical split element, utilizes its forward end to secure the hook during the tying operation.

U.S. Pat. No. 3,402,957 granted to Peterson, Sep. 24, 1968, discloses a fish hook threading and tying device including a light and a portion for securing the fish hook during the tying process.

U.S. Pat. No. 3,630,555 granted to Newlin, Dec. 28, 1971, discloses a knot tying device having a relatively flat, thin element including a slot having a cutting edge for cutting the leader and a cylindrical portion having bores therethrough for assisting in the knot tying.

U.S. Pat. No. 3,712,651 granted to Shockley, Jan. 23, 1973, discloses a knot tying device including spring-loaded clamping means for securing a fish hook in place during the knot tying process, and further including a cylindrical tube and a telescopically received rod for pulling the free end of the line through the loops.

U.S. Pat. No. 3,873,140 granted to Bloch, Mar. 25, 1975, discloses a fish hook holder and knot tying device including means to pierce the end of the leader allowing a barbed eyelet to be inserted within the end and three adjacent tying fingers extending from one end of the knot tying device.

U.S. Pat. No. 4,101,152 granted to Gardipee, Jul. 18, 1978, discloses a relatively rectangular knot tying jig which is used primarily for a fisherman's slipknot to secure a line to hooks, swivels and the like.

U.S. Pat. No. 4,403,797 granted to Ragland, Jr., Sep. 13, 1983, discloses a fishing line/knot tying tool configured like a fish and including an outwardly projecting tube to capture and shield the barbed end of a hook and including a laterally extending portion to grip the leader.

U.S. Pat. No. 4,572,554 granted to Janssen et al, Feb. 25, 1986, discloses a knot tying tool which is in reality a pair of identical tools which are used in symmetrical juxtaposition to form a barrel knot joining two fishing lines.

U.S. Pat. No. 4,613,173 granted to Rosser, Sep. 23, 1986, discloses a knot tying jig comprising a flat main body element which includes an offset through which a U-shaped bale is extended and includes a clamp to hold the fish hook.

U.S. Pat. No. 5,020,833 granted to Wardall, Jun. 4, 1981, discloses an accessory tool for anglers which combines a plurality of tools and functions within one instrument, thereby theoretically eliminating the clutter usually found in a fisherman's gear.

U.S. Pat. No. 5,236,232 granted to Broberg, Aug. 17, 1993, discloses a knot tying device which permits the formation of slip bobber knots for use with slip bobbers or floats for fishing and includes a knot support member having two axially directed bores extending therethrough.

U.S. Pat. No. 5,098,137 granted to Wardall, Mar. 24, 1992, discloses a device for facilitating knots in the shape of an elongated rectangle having a hole through one end portion and a forked portion at the opposite end, and including very specific dimensions.

DISCLOSURE OF THE INVENTION

With the above-noted prior art and inadequacies in mind, it is an object of the present invention to provide a single unitary tool which is simple to use, inexpensive to manufacture and of assistance in tying knots for either a right or left-handed person, since it is symmetric about a line along its long dimension.

Another object of the present invention is to provide a tool which allows the operator to tie a hook snell, a nail knot or a double nail knot with relative ease.

Yet another object of the present invention is to provide a tool which allows the fastening or splicing of any one of a number of lines, including super lines, super braids and monofilament.

Still a further object of the present invention is to provide a knot tying tool which can be used quickly and easily for tying knots in line of the same or different thickness and strength and which can be used to tie fixed loops as well as slipknots.

A further object of the present invention is to have a tool wherein holes in the handle may be used to space hooks or make a loop, and further the rearwardly facing shoulders or wings may likewise be used to form a loop or support the line.

Another object of the present invention is that the depression on the face of the tool adjacent the bifurcated tip is a line guide to assist a person with failing eyesight or other handicap in threading the line through the groove.

Yet another object of the present invention is that the downwardly extending rib or ridge along the longitudinal axis forms an elongated notch into which a hook may be cradled during the tying of a knot thereto.

Still a further object of the present invention is to provide a method of tying knots, including identical length double leaders, knots utilizing space-age fibers, and in general superior knots with all lines.

BRIEF DESCRIPTION OF THE DRAWINGS

FIG. 9 illustrates a step in tying a double strength leader with a second hook.

BEST MODE FOR CARRYING OUT THE INVENTION

Figure 1:
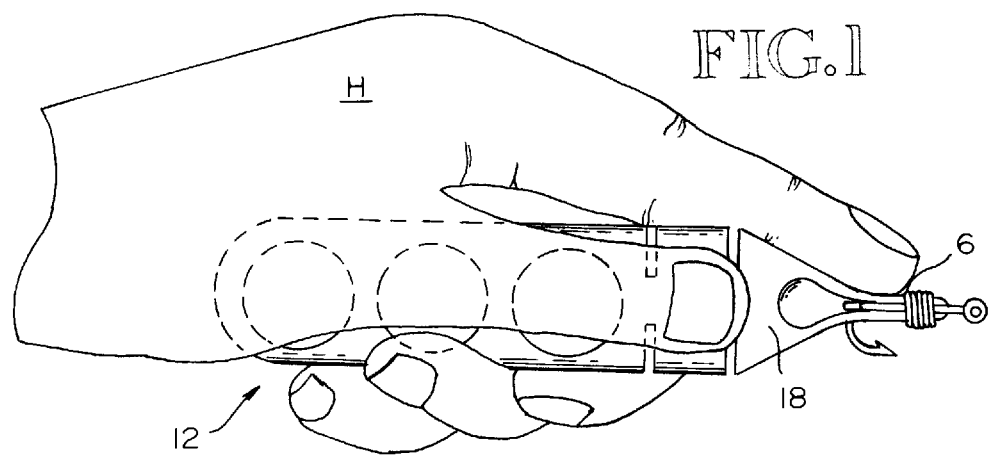
FIG. 1 is an isometric view showing the tool in use in the process of securing a leader to a hook utilizing a nail knot.

As seen in FIG. 1, the inventive knot tying tool, generally designated as 2, is shown in use with a human hand H, and further showing the main line 4 which is being secured to hook 6 held in place by a finger as explained hereinafter, and wherein the tag line 8 is temporarily secured by the thumb.

Figure 2:
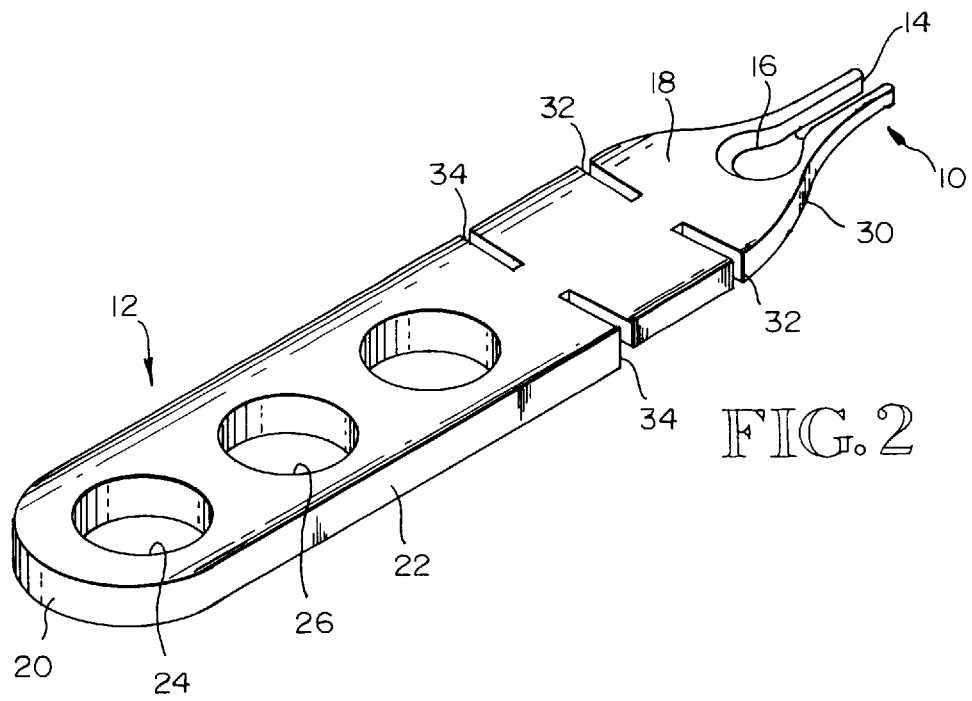
FIG. 2 is an isometric view of the inventive knot tying tool.

Referring now to FIG. 2, the inventive tool can be seen in greater detail and is generally flat and includes a working or operational end 10 and a handle end 12. The working end includes a notch 14 (see FIG. 3), a recessed portion 16 and a thumb pad 18. The handle portion has a curved end 20, a pair of sides 22 and a plurality of bores or openings therethrough 24, 26, 28.

Referring again to the working end 10, the tool flares outwardly from the notch 14 toward the handle portion 20, including curved side elements 30 which flow into sides 22. At the intersection of 22 and 30 there is a pair of opposing slots 32 perpendicular to the longitudinal axis. A second set of opposing slots 34 further spaced along sides 22 provide another means of forming a premeasured loop as well as a stable place to tighten a knot. The preferred embodiment of the tool has an overall length of 5 inches with the tip portion having a width of one eighth inch, the handle has a width of about one inch. The notch 14 is one half inch long and the holes 24, 26, 28 are five eighths inch in diameter.

Figure 3:
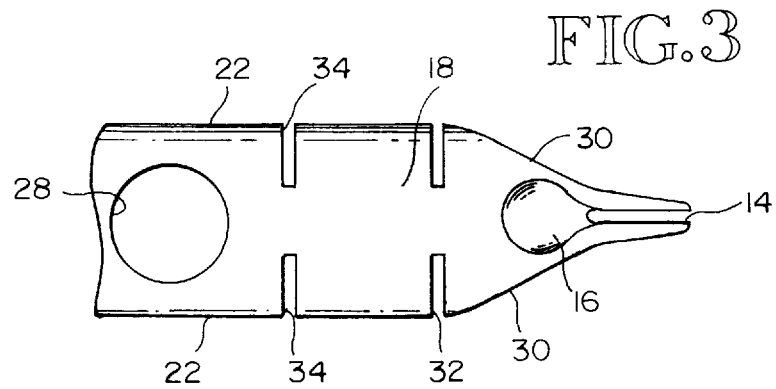
FIG. 3 is an enlarged partial plan view showing the bifurcated end portion of the inventive tool.

Reference is now had to FIG. 3, wherein the relationship between notch 14, recessed portion 16 and thumb pad 18 may be seen more easily.

Figure 4:
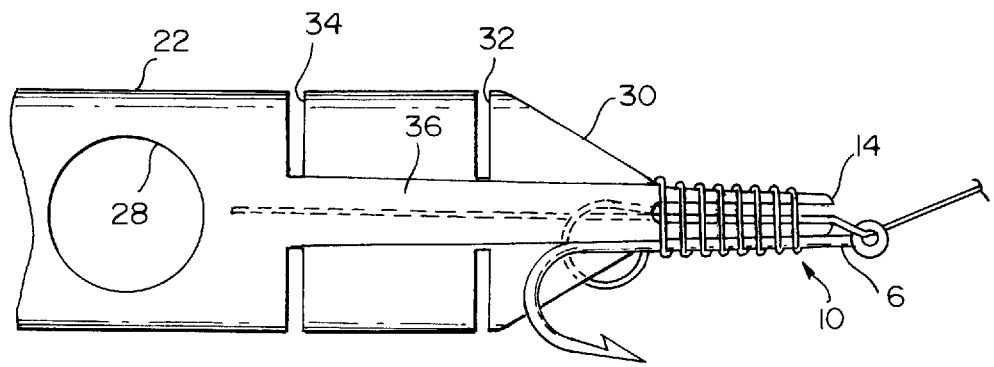
FIG. 4 is a bottom plane view which illustrates the tying of a nail knot to a hook using the downwardly extending ridge.

Referring now to FIG. 4, it can be seen how the inventive tool can be used to prepare a hook snell. The tool is placed in the palm of the user's hand and the index finger of that hand is extended along the bottom of the tool (see FIG. 1). The hook is placed between the index finger and the exterior edge of an axially located downwardly extending ridge 36 which extends from the tip to the opposing notches 34. The ridge 36 stiffens the front portion of the tool and provides a convenient location for holding the hook. The leader is placed in the groove, with the tag end 8 being held by a thumb. Eight to ten wraps are made around the end of the tool and the captured hook wrapping from the notch and moving toward the thumb or the handle end. The index finger is used to hold the wraps and then the leader end of the line is fed under the wraps and out through the eye of the hook. With a firm, even pull on the leader end, the wraps are slid off the tool and onto the hook, which will follow. The knot is tightened by pulling firmly on both ends of the line and the remaining tag end is removed.

Figure 5:
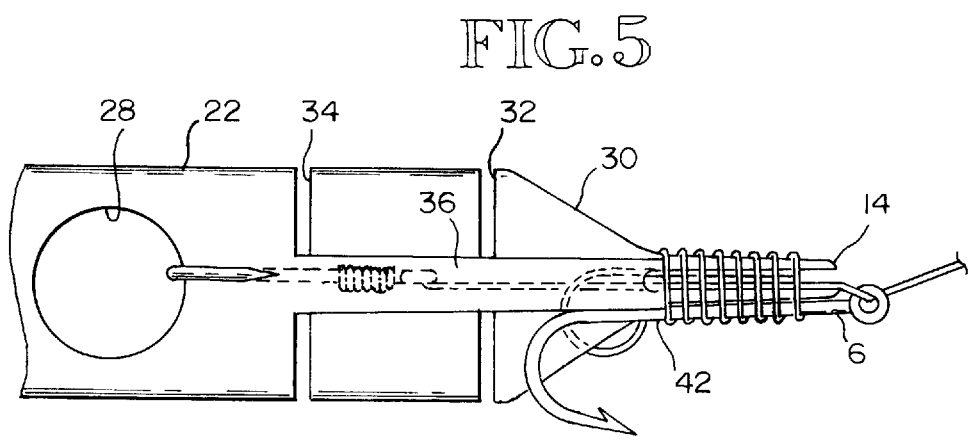
FIG. 5 illustrates the utilization of the present tool for securing multiple hooks to a single line.

As seen in FIG. 5, an identical knot may be used to tie two hooks to a leader and the first hook H1 is looped through hole 28 out of the way and giving it the desired spacing during the tying of the second hook H2.

Figure 6:
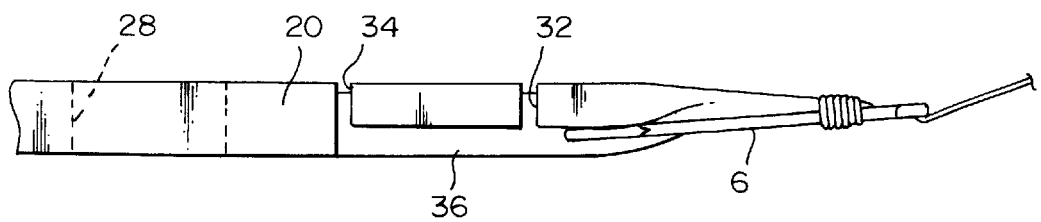
FIG. 6 is a side elevational view of the inventive tool.

FIG. 6 is a side elevation of the inventive tool more clearly showing the relationship between the main body 20 and the downwardly extending longitudinal ridge 36 and in particular the placement of the hook 6 during the tying of some of the knots.

Figure 7:
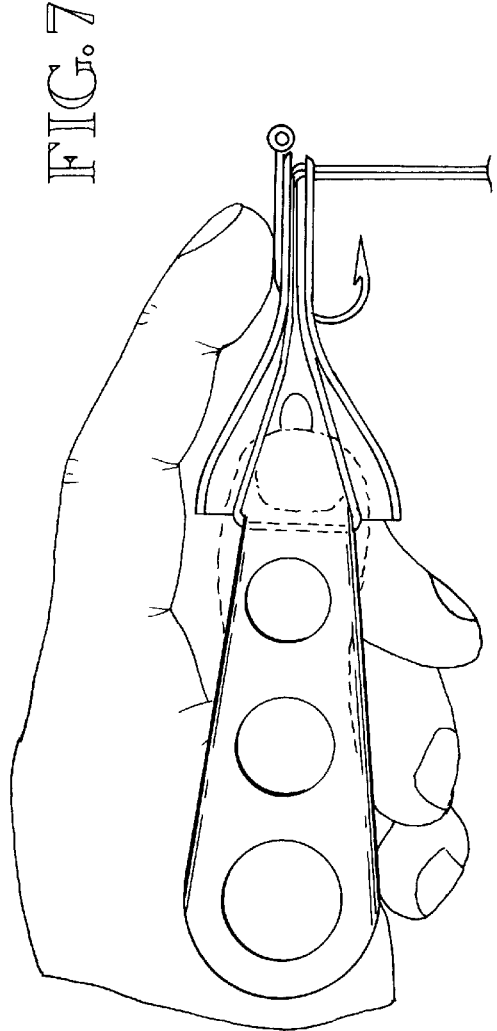
FIG. 7 illustrates the starting position for tying a basic hook snell knot.
Figure 8:
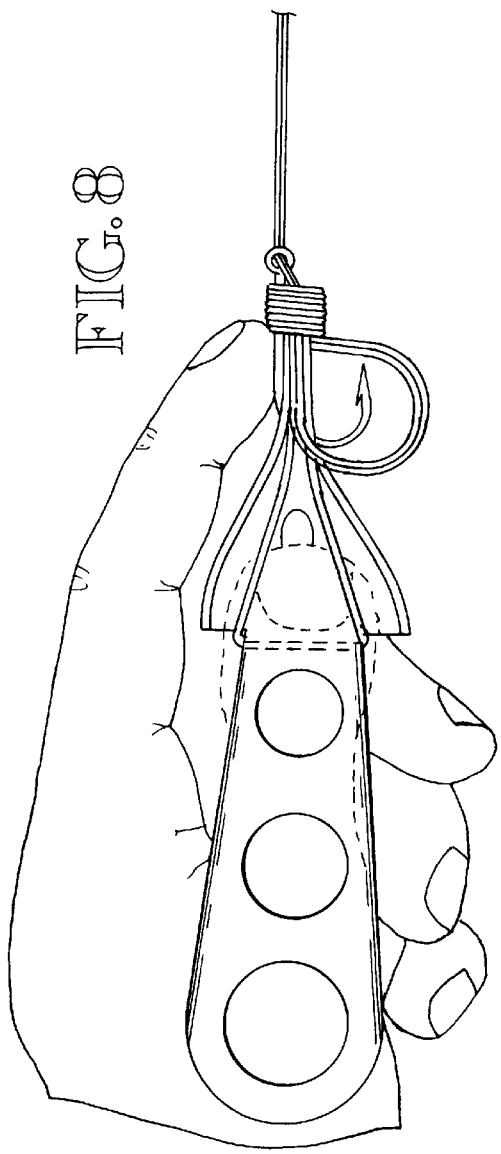
FIG. 8 illustrates a later step for tying a basic hook snell knot.

Using a different species of (the subject matter of the parent application) the inventive tool, the method of tying the basic knots now is illustrated in FIGS. 7 and 8 comprising the steps of a) cutting the desired leader length plus sixteen inches; b) placing the tool in the palm of the hand and loop the leader around the wings or rearwardly facing surfaces of the tool, placing both lines securely under the thumb on the thumb pad and in the tool groove; extending the tag end of the leader 8 inches past the tip of the tool and placing the hook securely between the index finger and the exterior edge of the tool, or alternatively, adjacent the downwardly projecting ridge; c) grasping both lines with the opposite hand, pulling both lines tight, making 4 double wraps starting at the notch and wrapping around the hook shank towards the thumb pad while trying to keep the wraps close together and not twisted, holding the index finger to hold the wraps; d) feeding both ends of the line (one at a time) through the groove, under the wraps, out the tip and through the eye of the hook; e) continuing to pull both ends of the leader until all slack line is taken up; f) gripping both ends close to the tip of the tool (loop around fingers makes a good grip), moving the next finger off the hook and wraps and with one quick, deliberate motion pulling the wraps off the tool and onto the hook; g) pulling both lines to tighten the wraps and the hook, releasing the loop from the wings of the tool and putting the hook in one of the holes in the tool handle to pull the wraps off the shank to the eye and then trimming all tag ends.

To tie a double strength salmon leader, as illustrated in FIGS. 7, 8 and 9, begin by a) cutting the desired length of leader plus 28 inches; b) placing tool in the palm of the hand and looping leader around the wings or other rearwardly facing portions of the tool and placing both lines securely under the thumb on the thumb pad and in the tool groove, extending the tag end of the leader 14 inches past the tip of the tool and placing the hook securely between the index finger and the exterior edge of the tool opposite the groove or the adjacent the ridge at the back of the tool; c) to tie first hook, follow steps c–f of the basic hook snell illustrated in FIGS. 7 and 8; do not trim off tag ends this time, however. This modified salmon leader allows a double line between the two hooks, virtually insuring that if one line is broken, your fish will stay onto the second line; d) placing the first hook in any one of the three holes in the tool handle to get the desired spacing between the hooks; e) placing the tool in the palm of the hand, place both lines securely under the thumb on the thumb pad and the tool groove, placing the second hook securely between the index finger and the exterior edges of the tool opposite the groove or adjacent the downwardly extending ridge; f) to tie the second hook, follow the steps c–f of the basic hook snell; g) holding both lines to tighten the wraps on the second hooks, letting the wraps stay midway on the shank of the hook and trimming all tag ends.

Thus is it can be seen that the present invention provides a tool for rapidly and easily tying superior knots, and further, through the use of the tool, knots that were heretofore difficult, if not impossible to tie, are likewise easily and quickly tied.

Thus it can be seen that the present invention is simple of structure, versatile and usable for a variety of knots even under adverse conditions, including physical handicaps.

I claim:

1. A tool for tying fishing knots, comprising:

an elongated main body portion having a relatively narrow, bifurcated working end and an opposing handle portion, the working end flaring outwardly toward parallel sides to form the handle portion, said main body portion being of substantially the same thickness except at and adjacent to the working end, whereat the side portions are thinner, leaving a central elongated ridge; and at least one pair of opposing notches along the sides of the main body portion adjacent the working end thereof and at least one bore in the handle portion, whereby a hook may be held against the ridge while securing it to a line while using the tool and one hook of a multiple hook gear may be supported in the bore while tying another hook.

2. A tool as in claim 1, wherein the main body portion includes two pair of spaced opposing notches.

3. A tool as in claim 1, wherein the main body portion includes a plurality of bores.

* * * * *